March 25, 1952  J. L. WILSON  2,590,590
GAUGE FOR VEHICLE WHEELS
Filed May 14, 1947
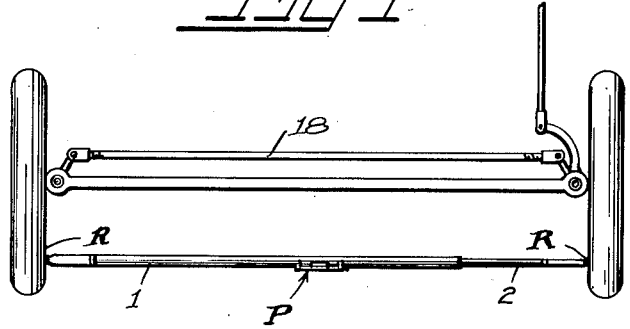
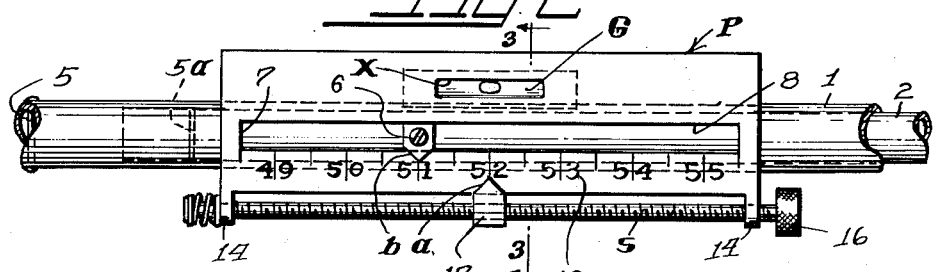
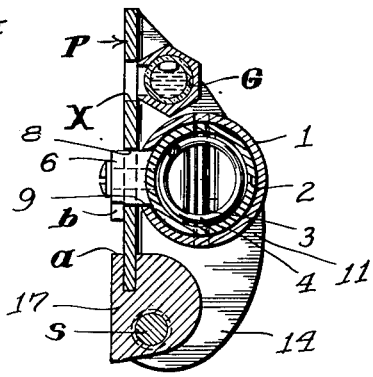
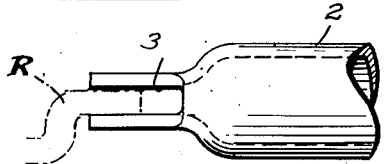
INVENTOR.
Joseph L. Wilson
BY
Wilfred Lawson
Attorney Patented Mar. 25, 1952

2,590,590

UNITED STATES PATENT OFFICE 2,590,590

GAUGE FOR VEHICLE WHEELS

Joseph L. Wilson, Matawan, N. J.

Application May 14, 1947, Serial No. 748,025

2 Claims. (Cl. 33—203.2)

This invention relates to a gauge for vehicle wheels and has relation more particularly to a device of this kind especially designed and adapted for use in connection with the aligning of the front or steering wheels of a vehicle such as comprised in a motor driven car, and it is primarily an object of the invention to provide a device of this kind which, after being applied for determining the correction to be made between relative wheels, can be maintained in operative engagement and supported by the wheels whereby the aligning operation is materially facilitated.

It is also an object of the invention to provide a gauge of this kind which can be employed with equal facility with wheels of different sizes or varying trackage relation within, of course, certain limitations.

The invention consists in the details of construction and in the combination and arrangement of the several parts of my improved gauge whereby certain advantages are attained, as will be hereinafter more fully set forth.

In order that my invention may be better understood, I will now proceed to describe the same with reference to the accompanying drawing, wherein:

Figure 1 is a view in top plan of a gauge constructed in accordance with an embodiment of my invention and in applied position.

Figure 2 is an enlarged fragmentary view in front elevation of the central portion of the gauge as herein embodied;

Figure 3 is a sectional view taken substantially on the line 3—3 of Figure 2;

Figure 4 is an enlarged fragmentary sectional view illustrating the spring assembly associated with the telescoping members; and Figure 5 is an enlarged fragmentary view of the outer end portions of one of the members of the gauge.

In the embodiment of the invention as illustrated in the accompanying drawings, the gauge comprises an elongated, straight tubular member 1 in one end portion of which telescopically engages a second elongated straight member 2. In the present instance, each of these members 1 and 2 is tubular although this is not necessary. However, it is important that the outer extremity of each of these members 1 and 2 be provided thereacross with a slot or recess 3 which can readily be engaged over the marginal portion of the rim R of a wheel. By the provision of these recesses or notches 3, the device as a unit may be held by the wheels with which it is being employed and during the period of adjustment, whereby the adjusting operation is materially facilitated.

Within the member 1 and inwardly of the inserted end of the member 2 is an expansible member 4, preferably a coil spring. One end portion of this member or spring bears against a pin 5 intersecting the member 1 while the opposite end portion, of course, bears against the pin 5a of the member 2. This member or spring 4 serves to constantly urge the members outwardly to an extent determined by contact of the index block 6 with the end edge 7 of a slot 8 disposed lengthwise through an indicator plate or gauge member P. This slot 8 registers with the slot 9 in the adjacent portion of the wall of the member 1 as the index block 6 is fixedly carried by the inserted portion of the member 2.

The gauge member or plate P is of desired length and is provided at its opposite ends with the laterally disposed wings 11 which are welded or otherwise securely affixed to the inner portion of the member 1 at a desired point therealong. The outer face of the plate P below the slot 8 is provided with the linear graduations 12 herein shown as indicating consecutively, in inches, from "49" to "55."

The central portion of the gauge member or plate P above the slot 8 is provided with a sight opening $x$ to allow visual access to the level glass G carried by the plate P rearwardly thereof and which gauge glass G permits to be readily determined by the user when the device when in use is in desired level position between the wheels.

The inwardly disposed wings 11 of the gauge member or plate P are continued downwardly to provide the lugs 14 which serve as bearings for a threaded shaft S, which has at one end a head 16 to permit the same to be readily rotated in either direction.

Threaded on this shaft S is a second index block 17, the upper portion of which, as at $a$, being pointed and overlying the lower marginal face of the plate P for coaction with the graduations 12. The index block 6, hereinbefore referred to, also has a pointed portion $b$ which extends downwardly therefrom and overlies the face of the plate P below the slot 8.

In a working operation, the device as a unit is placed between the front wheels of a vehicle with the slots or recesses 3 operatively receiving the inner marginal portions of the wheel rims R. The telescopic engagement of the member 2 with the member 1 readily permits this application and, of course, after there has been the proper placing of the device, the expansible member or spring 4 constantly urges the member 2 outwardly with a correspondent exertion on the member 1, whereby the device as a unit is effectively held by the rims of the wheels and which is particularly advantageous during the time the adjustment of the wheels is being accomplished.

In practice, the device is first placed between the forward portions of the rims R of the front or steering wheels and in substantially a horizontal plane with the axis of the wheels. If the forward portions of the wheels should, for example, be spaced apart 52 inches, the pointer $a$ will manually be brought into register with the graduation "52" by proper rotation of the shaft S. The tool is then operatively engaged between the rear portion of the wheels in substantially the same plane as the axial center thereof and if the pointers $a$ and $b$ should register "52," it is then quickly indicated that the wheels are in proper alignment. However, if upon the second or rear application of the tool the pointer $b$ should go beyond the pointer $a$ or stop before reaching the pointer $a$, it can be readily determined whether the aligning operation of the wheels should be outward or inward. Obviously, upon the passing of the pointer $b$ beyond the pointer $a$ it will be understood there must be an outward adjustment of the rear portion of the wheels, whereas if the pointer $b$ stops before reaching the pointer $a$ the adjustment of the wheels must be reversed.

For example, if upon the rear application of the tool to the wheels the pointer $b$ should stop at 53, it would indicate to the operator that there must be an inward adjustment on the rear of the wheels of one-half inch. In other words, whatever may be the differences in distances between the pointers $a$ and $b$, the operator will properly adjust the wheels one-half of such distance.

The tie-rod 18 is the only alignment adjustment on the front wheels of an automobile. This is threaded on both ends and by turning the rod in one direction, the rear of the wheels are drawn in and by turning it the other direction, the rear of the wheels are forced out. When the wheels are adjusted inwardly in the rear they naturally are forced out the same distance in the front as they pivot on the spindle pin and axle, which is actually in the center of the wheel.

In cars now generally being produced a toe-in is not required except in very rare cases as the front wheels are individually supported by knees. In such rare cases needing toe-in, after the alining operation has been completed as hereinbefore set forth, the desired toe-in adjustment may be easily made.

With the older type of cars with solid axles toe-in of the front wheels is necessary. This toe-in adjustment can be easily made after the alining operation.

From the foregoing description it is thought to be obvious that a gauge constructed in accordance with my invention is particularly well adapted for use by reason of the convenience and facility with which it may be assembled and operated.

I claim:

1. In a wheel aligning gauge, a pair of tubular members telescopically assembled for relative endwise movement, means at the outer ends of said members for engaging the rims of the wheels, a gauge member mounted on one of said tubular members and positioned relatively to the telescoped ends of said tubular members, the said one tubular member having an elongated slot in its telescoped end and in line with a like slot formed in said gauge member, the slot in said gauge member having a scale of graduations extending along the lower edge thereof, an index carried by the telescoped end of the other of said tubular members and projecting through the aligned slots for cooperation with the said scale of graduations, a screw shaft journalled at its opposite ends in the lower part of said gauge member, a second index mounted on said shaft, and a knurled head at one end of said shaft for turning the same to affect movement of said second index therealong relative to the said scale of graduations.

2. The invention as defined in claim 1, with a coiled spring housed within the telescoped ends of said tubular members and interconnecting the same, said spring being of an expansion type acting to tension said tubular members into engagement with the rims of the wheels.

JOSEPH L. WILSON.

REFERENCES CITED

The following references are of record in the file of this patent:

UNITED STATES PATENTS

| Number | Name | Date |
|---|---|---|
| 1,186,334 | Robinson | June 6, 1916 |
| 1,266,313 | Prestwich | May 14, 1918 |
| 1,639,604 | Gray | Aug. 16, 1927 |
| 1,894,370 | Erickson | Jan. 17, 1933 |
| 1,922,344 | Bagge | Aug. 15, 1933 |
| 2,159,084 | Harrison | May 23, 1939 |
| 2,363,060 | Greenleaf et al. | Nov. 21, 1944 |
| 2,497,481 | Weber | Feb. 14, 1950 |

FOREIGN PATENTS

| Number | Country | Date |
|---|---|---|
| 394,090 | Great Britain | June 22, 1933 |